Nov. 14, 1967  J. T. GREENSLADE  3,352,517
AUTOMATIC LAP BELT MECHANISM
Filed Oct. 20, 1965  2 Sheets-Sheet 1
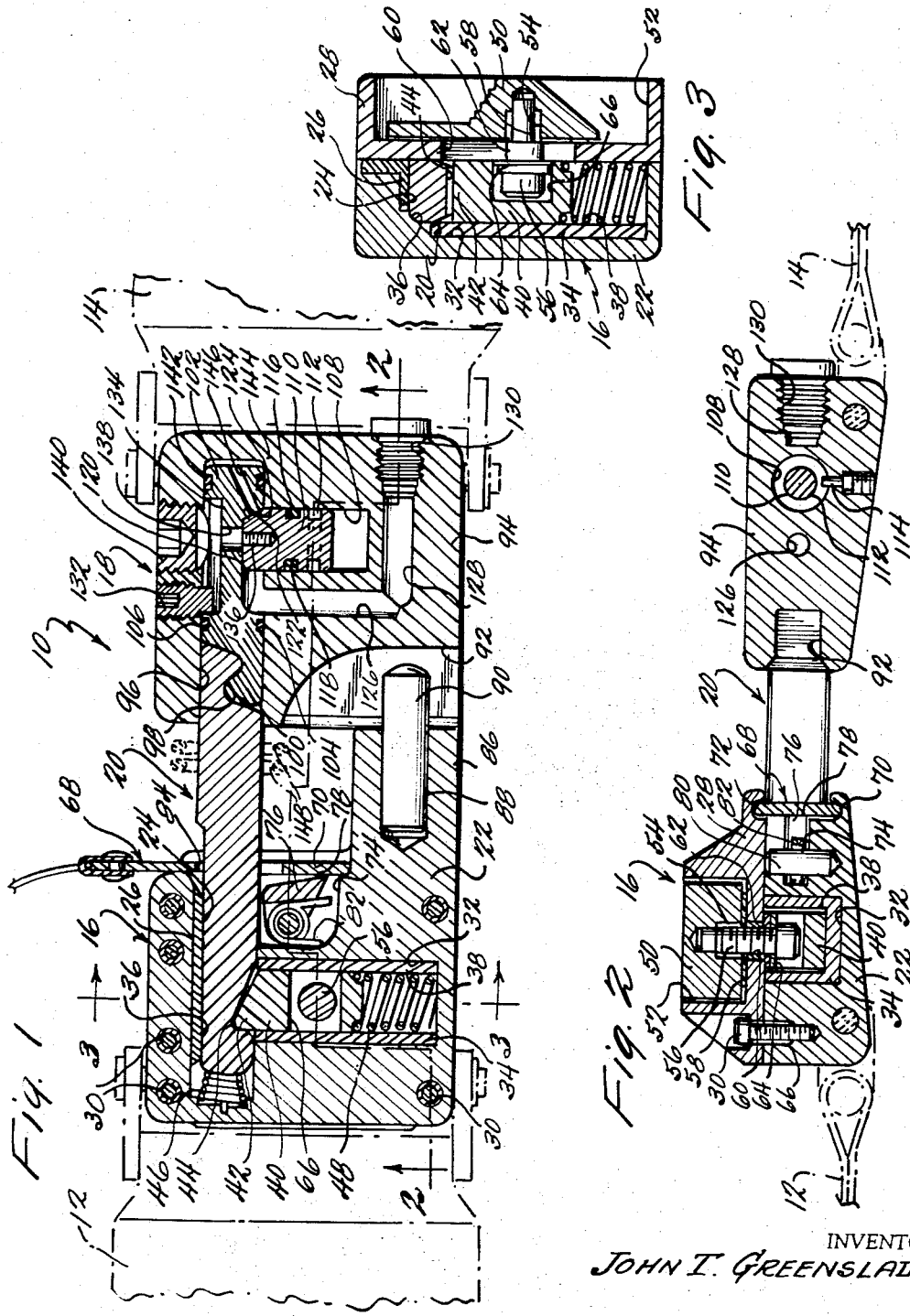
INVENTOR
JOHN T. GREENSLADE
BY
ATTORNEYS Nov. 14, 1967   J. T. GREENSLADE   3,352,517
AUTOMATIC LAP BELT MECHANISM
Filed Oct. 20, 1965   2 Sheets-Sheet 2
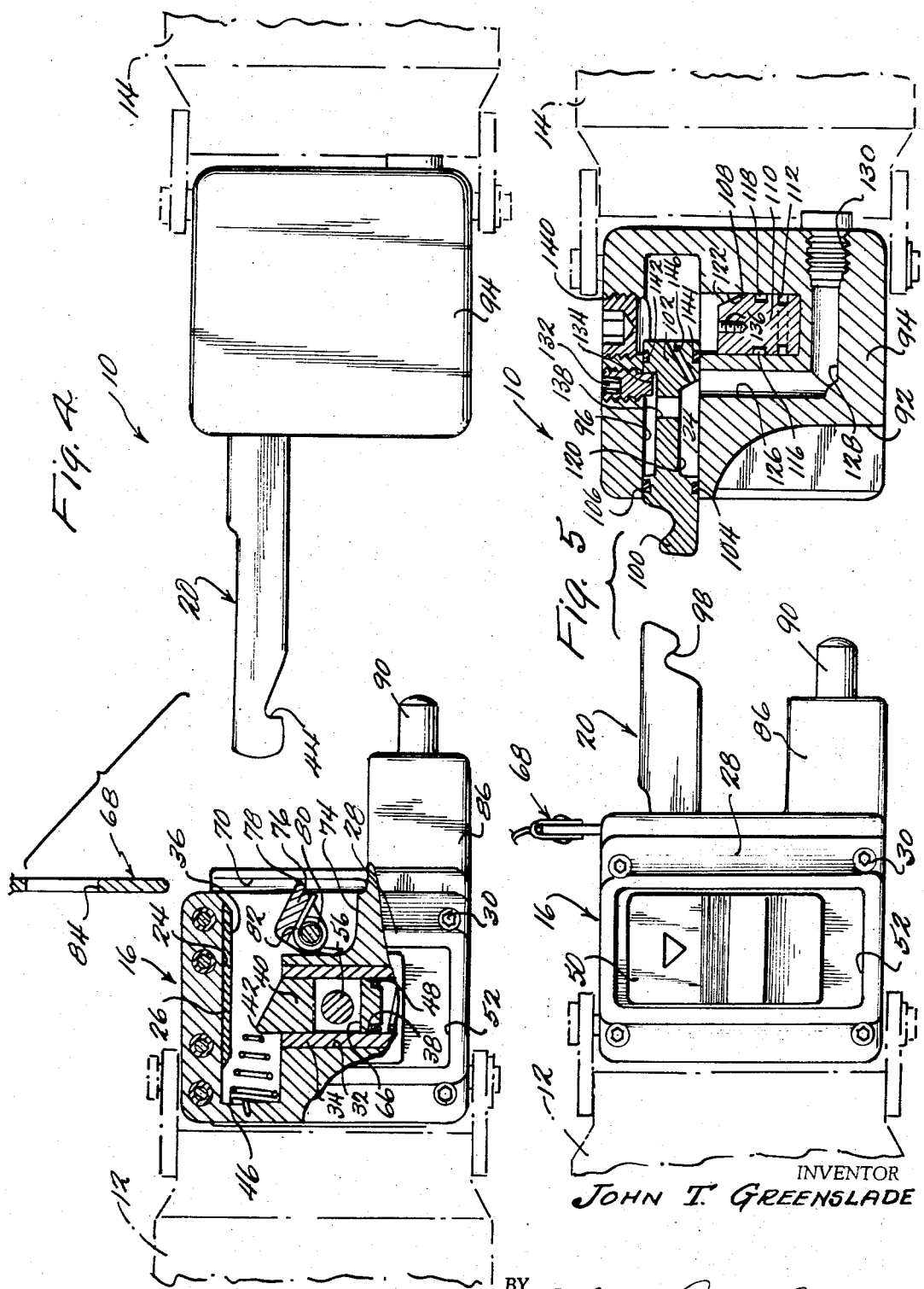
INVENTOR
JOHN T. GREENSLADE
BY
ATTORNEYS

United States Patent Office 3,352,517
Patented Nov. 14, 1967

3,352,517
AUTOMATIC LAP BELT MECHANISM
John Timothy Greenslade, Scottsdale, Ariz., assignor to Rocket Power, Inc., Mesa, Ariz., a corporation of Arizona
Filed Oct. 20, 1965, Ser. No. 498,588
16 Claims. (Cl. 244—122)

ABSTRACT OF THE DISCLOSURE

This invention is a gas pressure operated automatic lap belt mechanism for an aircraft ejection seat. The lap belt mechanism disclosed herein provides manual fastening and separation of the two portions of a lap belt to permit normal ingress and egress of a pilot to the ejection seat and, as well, provides an automatic powered, positive separation of the lap belt during ejection. A primary advantage of the present invention is that automatic ejection is unaffected by the amount of lap belt tension. This is not true for many known automatic lap belt mechanisms. The claimed lap belt mechanism has three components—a manual release section attached to a first portion of the lap belt, an automatic release section attached to a second portion of the lap belt and a locking member for rigidly fastening the two sections together. One end of the locking member is normally rigidly locked in the automatic release section and the other end of the locking member is releasably connectable to the manual release section by insertion therein. Means are provided to prevent connection of the locking member with the manual release section unless a parachute release clip is inserted therein. Connection of the locking member with the parachute release clip inserted in the manual release section locks the release clip in place. Automatic separation of the lap belt is effected during ejection by gas pressure operated means which unlocks and propels the locking member from the automatic release section thereby effecting a powered separation of the two sections of the lap belt mechanism. After powered separation, the locking member remains connected to the manual release section and the parachute release clip remains locked therein to provide a means for automatic opening of the pilot's parachute.

---

This invention relates to a safety apparatus and more particularly to an automatic lap belt mechanism of the type adapted to be used in conjunction with an ejectable seat for a pilot or the like.

Lap belt mechanisms which are manually separable to permit normal ingress and egress of a pilot to the seat in an aircraft are well-known. Conventionally, lap belt mechanisms of this type are also provided with means for effecting a release of the lap belt during the ejection cycle. The manner in which release during the ejecting cycle has been effected heretofore has provided some difficulty. These difficulties have resulted largely because of the great variance in the tensile forces in the lap belt mechanism at the instant of release. Where the belt tension forces are excessive, there is presented the possibility that they will prevent proper release whereas when little or no belt tension exists, there is presented the possibility that the lap belt mechanism will not properly separate even though the locking mechanism is released.

Accordingly, it is an object of the present invention to obviate these difficulties by providing a lap belt mechanism which is releasable during the ejecting cycle by operation of a locking mechanism unaffected by the amount of belt tension at the time of release and which is positively separated by a power actuation.

Another object of the present invention is to provide a lap belt mechanism of the type described having improved means for effecting a power actuated separation of the lap belt sections during the ejection procedure.

A further object of the present invention is the provision of a power-separated lap belt mechanism of the type described which is operable to compensate for the effects of internal friction forces applied as a result of external belt tension forces.

Still another object of the present invention is the provision of a lap belt mechanism having improved means for preventing connection of the lap belt sections except when the parachute automatic release cable is operatively attached.

A still further object of the present invention is the provision of a lap belt mechanism which is simple in construction, effective in operation, and economical to manufacture and maintain.

These and other objects of the present invention will become more apparent during the course of the following detailed description and appended claims.

The invention may best be understood with reference to the accompanying drawings wherein an illustrative embodiment is shown.

In the drawings:

FIGURE 1 is a horizontal sectional view of a lap belt mechanism embodying the principles of the present invention;

FIGURE 2 is a sectional view taken along the line 2—2 of FIGURE 1;

FIGURE 3 is a sectional view taken along line 3—3 of FIGURE 1;

FIGURE 4 is a top plan view, partly in section, showing the position of the parts prior to manual connection; and FIGURE 5 is a view similar to FIGURE 4 showing the position of the parts after power separation during the ejection cycle.

Referring now more particularly to FIGURES 1–3 of the drawings, there is shown therein a lap belt mechanism generally indicated at 10 which embodies the principles of the present invention. The mechanism 10 is adapted to be used in conjunction with the conventional ejectable seat for a pilot or the like (not shown). In accordance with conventional practice, the mechanism 10 is used to connect and disconnect the adjacent ends of two lap belt portions, generally indicated at 12 and 14 in FIGURES 1 and 2, the opposite ends of which are anchored to the ejectable seat. The mechanism 10 of the present invention is adapted to permit manual connect and release of the two lap belt portions 12 and 14 by the pilot and during the cycle in which the pilot is ejected with the seat, the mechanism 10 is adapted to separate under the action of gas under pressure generated by the ignition of a ballistic charge.

As best shown in FIGURES 1–3, the mechanism 10 of the present invention includes a first manual release section, generally indicated at 16, connected in a conventional fashion to belt portion 12, a second automatic power release section 18 connected in a conventional fashion to belt portion 14 and an elongated locking member 20 which is adapted to cooperate with each of the sections 16 and 18.

The manual release section 16 comprises a lower body portion 22 having a transverse, horizontally extending cavity 24 formed therein, one vertical wall of which has one flange of an L-shaped insert 26 engaged therewith. The opposite flange of the insert 26 is engaged in a cooperating recess formed in the upper surface of the lower body portion 22 which extends horizontally away from the cavity 24. An upper body portion is preferably detachably secured, as by bolts 30 or the like, to the lower body portion 22 in engagement with the insert 26.

The lower body portion 22 also includes a second transversely disposed cavity 32, one end of which communicates with the cavity 24 intermediate the ends of the latter. Preferably, a channel-shaped insert 34 is engaged within the cavity 32, the free ends of the legs of which are engaged by the adjacent surface of the upper body portion 28.

The lower and upper body portions 22 and 28, when secured together with inserts 26 and 34 properly positioned therebetween, provide an opening or recess 36 for receiving the locking member 20 and an opening or recess 38 communicating with the opening 32 and extending transversely with respect thereto for slidably receiving a manual locking element 40.

As best shown in FIGURE 1, the locking element 40 includes an inclined end portion 42, similar in configuration to a conventional door latch, which is adapted to project into the recess 26 and engage within a similarly shaped recess 44 formed in the adjacent surface of the locking member 20. Preferably, the inner end of the opening or recess 36 has the inner end of a spiral spring 46 mounted therein, the outer end of which is adapted to be engaged by the adjacent end of the locking member 20.

The locking element 40 is resiliently biased to maintain the end portion 42 outwardly into the recess 36 by a coil spring 48 mounted within the opening 38 between the inner end thereof and the inner end of the locking element 40. The spring 48 will permit yielding movement of the locking element in a direction away from the recess 36 in response to the movement of the locking member 20 into the latter. Any suitable means is provided for effecting a manual movement of the locking element 40 out of engagement with the recess 44 to manually release the locking member 20 under the action of the spring 46.

As shown, the manually operable means comprises a thumb button 50 disposed within an elongated rectangular recess 52 formed in the upper surface of the upper body section 28. The thumb button 50 is mounted for sliding rectilinear movement within the recess 52 and operatively engaged with the locking element 40 by any suitable means. As shown, an interiorly threaded insert 54 is fixedly engaged within the central lower portion of the thumb button 50 to receive the upper end of a bolt 56. A washer 58 is mounted on the bolt between the lower surface of the thumb button 50 and the upper body portion 28. An elongated slot 60 is formed in the upper body portion 28 through which the bolt 56 extends. Preferably, the portion of the bolt 56 which is disposed within the slot 60 has a collar or sleeve 62 mounted thereon, one end of which engages the washer 58, the other end of which engages a pair of washer elements 64.

In this way, the thumb button 50 is mounted for sliding movement within the upper body portion 28 and when the latter is mounted in cooperating relation with the lower body portion 22, the thumb button is operatively connected with the locking element 40 through the engagement of the washer elements within the recess 66 so that a sliding movement of the thumb button 50 will effect a corresponding sliding movement of the locking element 40 against the action of the spring 48 to release the locking member 20 from the recess 36.

In accordance with the principles of the present invention, means is provided for permitting connection of the locking member 20 with the manual section 16 only after a conventional automatic parachute release clip, generally indicated at 68, is properly moved into operative position. To this end, the lower and upper body portions 22 and 28 are formed with a pair of opposed clip receiving grooves 70 and 72 respectively. As best shown in FIGURES 1 and 2, the outer end portions of the grooves 70 and 72 communicate with the outer portion of the locking member receiving opening or recess 36. Formed in the lower body portion 22 at a level intermediate the grooves 70 and 72 is a horizontally extending slot which is open at one end between the grooves 70 and 72 and at an adjacent side communicates with the recess 36.

Mounted within the horizontal slot 74 is a stop block 76. As shown, the stop block is preferably in the form of a generally U-shaped member, the bight portion of which is formed with an outwardly extending angular configuration, as indicated at 78. The legs of the U-shaped stop block 76 are apertures to receive a pivot pin 80 extending through a corresponding bore formed in the adjacent lower body portion 22. A coil torsion spring 82 is mounted in surrounding relation to the pin 80 between the legs of the stop block 76 and has its ends engaged respectively to the inner end of the slot 74 and the bight portion of the stop block. The spring 82 serves to resiliently urge the stop block into a limiting position, as shown in FIGURE 4, wherein the angular surface 78 is disposed within the mouth of the opening or recess 36, thus preventing entrance of the locking member 20 therein.

It will be noted that when the stop block is disposed in the recess blocking position, the the angular bight portion 78 is also disposed in the path of movement of the clip 68 within the grooves 70 and 72. Consequently, in operation, when the clip 68 is moved into operative position between the grooves 70 and 72, the stop block will be pivoted from its recess obstructing position, as shown in FIGURE 4, to a position permitting free access to the recess 36 as shown in FIGURE 1. It will be noted that the automatic parachute release clip 68 is formed with an opening 84 through which the locking member 20 may extend when the clip is disposed in its operative position.

As best shown in FIGURE 1, the lower body portion 22 includes a projection 86 extending parallel with the opening 36 and having a central aperture 88 formed therein for fixedly receiving one end portion of a pin 90. The pin 90 extends outwardly from the projection 86 and is adapted to engage within an opening 92 formed in the adjacent portion of a rigid body 94 of the automatic power release section 18. The body 94 also includes a main bore 96 defining an opening disposed in longitudinal alignment with the opening 36 of the manual release section 16 to receive the opposite end portion of the locking member 20.

The opposite extremity of the locking member 20 is formed with a notch 98 defining a locking finger. A cooperatively shaped locking finger 100 is formed on the adjacent end of a push rod 102 disposed within the bore 96. Formed in the periphery of the push rod 102 adjacent the locking finger 100 is an annular groove 104 within which an O-ring seal 106 is mounted for sealing engagement with the interior periphery of the bore 96.

Extending inwardly from one side of the body 94 is a cylindrical bore 108 which intersects the bore 96 at a position intermediate the ends of both. The portion of the bore 108 extending inwardly from its intersection with the bore 96 defines a cylindrical chamber within which a locking piston 110 is slidably mounted. The locking piston has a first annular groove 112 formed in the exterior periphery thereof adjacent its inner end for receiving one end of a shear pin 114 suitably mounted in the body 94 and extending upwardly therethrough into the chamber 108 and the annular groove 112 of the piston to retain the same in normal locking position. The piston 110 has a second annular groove 116 formed in the exterior periphery thereof at a position disposed outwardly of the annular groove 112 and an O-ring seal 118 is disposed within the groove 116 in sealing relation to the interior periphery of the bore 108.

When the locking piston 110 is disposed in its normal locking position, as shown in FIGURE 1, the outer end thereof extends within the adjacent portion of the bore 96. To accommodate this position of the piston 110, the adjacent central portion of the push rod 102 is recessed as indicated at 120. The end portion of the locking piston 110 and the adjacent portion of the push rod 102 are provided with interengaging inclined locking surfaces 122 and 124, respectively. The angle of inclination of the locking surfaces 122 and 124 will depend upon the coefficient of static friction between these surfaces and the coefficient of static friction of the locking piston 110 within the chamber 108. Preferably, the angle of inclination is chosen with respect to these friction forces so that forces transmitted to the push rod 102 along the axis of the bore 96, as by belt tensioning or the like, will apply a component of force to the locking piston 110 in the direction of the axis of the chamber 108 which is generally equal to the force required to overcome the friction, resulting from the force component acting on the piston in a direction perpendicular to the axis of the chamber 108. In this way, the added force required to effect movement of the locking piston into a release position will always be generally equal to the force required to fracture the shear pin 114. This insures that the power available to effect movement of the piston into its release position will always be effective even when there is an excessive force applied to the push rod as a result of belt tensioning. Stated differently, the angle of inclination of the interengaging surfaces 122 and 124 is such that the force required to release the locking member 20 is substantially constant and is substantially unaffected by the amount of belt tension applied at the time that release is desired. An exemplary angle of inclination is 15 or 16° with respect to the axis of the chamber 108.

The piston 110 is moved from its normal locking position, as shown in FIGURE 1, in response to the introduction of gas under pressure to the inner end portion of the bore 96. To this end, a bore 126 is formed in the body 94 in parallel relation to the bore 108 which, like the bore, intersects the main bore 96 at a position intermediate the ends of both. The inner end of the bore 126 communicates with the inner end of a second bore 128 formed in the body 94 with its axis parallel to the axis of the bore 96. The outer bore 128 is interiorly threaded, as indicated at 130, for receiving a fitting (not shown) on one end of a fluid pressure line (not shown) the opposite end of which is connected with a gas generator including a ballistic charge or the like. In accordance with conventional practice, the ballistic charge is initiated in conventional fashion and proper sequence during the ejection cycle, all of which is well known in the art.

The outer end of the bore 126 is closed as by a plug, the inner end of which extends within the bore 96. The adjacent side of the push rod 102 is formed with an elongated, generally rectangular shaped slot 134 for receiving the inwardly projected end of the block 132.

Formed in the outer end of the locking piston 110 is a threaded opening 136 within which a threaded shank or the like (not shown) may be inserted to effect movement of the piston from its released position into its locking position. In order to permit entry of such a threaded shank, the adjacent portion of the push rod 102 is formed with an access opening 138. The outer end of the bore 108 is closed by any suitable means, such as a plug 140 or the like.

Formed in the outer periphery of the inner end portion of the push rod 102 is an annular groove 142 within which an O-ring seal 144 is mounted in sealing engagement with the adjacent interior periphery of the inner end portion of the bore 96. The O-ring seal 144 thus defines an inner pressure chamber within the inner extremity of the bore 96. This chamber is communicated with the adjacent portion of the bore 96 by an inclined passage 146 extending from the inner end surface of the push rod 102 to the adjacent inclined surface 124 thereof.

*Operation*

The lap belt mechanism 10 of the present invention is operable to permit normal ingress and egress of the pilot to and from the ejectable seat through release of the manual section 16. Referring to FIGURE 4, it will be noted that the locking member 20 is normally connected in locked relation with the automatic section 18 and that the locking member 20 cannot be engaged within the opening 36 of the manual section to lock the sections together due to the obstruction provided by the spring pressed stop block 76. Consequently, in order to close and lock the lap belt mechanism of the present invention, the parachute release clip 68 must first be engaged within the grooves 70 and 72 to effect a pivotal movement of the stop block out of its obstructing position within the opening 36 into the position shown in FIGURE 1. The locking member 20 is carried by the automatic section 18 (after engagement of conventional shoulder strap connectors, indicated in phantom at 148 in FIGURE 1) can then be moved inwardly of the opening 36 through the opening 84 in the parachute release clip 68 until the notch 44 formed therein is disposed in a position to receive the locking bolt 40. During this movement, it will be understood that the inner end of the locking member 20 will first serve to depress the locking bolt 40 as well as the release spring 46.

In this way, the locking member 20 cannot be pushed into the manual section opening 36 unless the parachute automatic release clip 68 is properly positioned to effect actuation of the parachute in the event of seat ejection. In this regard, it will be understood that during the ejection procedure, separation of the lap belt mechanism 10 is effected between the locking bolt 20 and automatic section 18 so that the parachute release clip 68 is retained with the manual section 16 after automatic release.

In accordance with conventional practice, automatic separation is initiated in the usual sequence during the ejection cycle. Such ignition serves to fire a ballistic charge which generates gases under pressure which, in turn, are communicated to the main bore 96 of the section 18 through bores 128 and 126. When the gas pressure within the bore 96 between the seals 144 and 106 reaches a predetermined value, as, for example, 500 p.s.i., sufficient to fracture the shear pin 114, piston 110 will move inwardly of the chamber 108. During the inward movement of the piston 110, passage 146 in the push rod is uncovered so as to communicate the pressure acting on the piston with the inner chamber of the bore 96. Consequently, as the piston moves all the way into the chamber 110 and interengaging inclined locking surfaces 122 and 124 separate, the entire gas pressure within the chamber 96 acting upon the end surface of the push rod will effect a power movement of the latter and hence the locking member 20 connected therewith outwardly in a direction to separate the two sections 16 and 18. When the interengaging locking fingers of the locking member 20 and push rod 102 move outwardly of the bore 96, the continued movement of the locking member 20 and section 16 serves to separate the section 18 therefrom (the movement of the push rod 102 with respect to section 18 being stopped by virtue of engagement of the end of the slot 134 with the projecting end of the plug 132, as shown in FIGURE 5). It will be noted that the gases utilized to effect power separation and release of the two sections during ejection is retained within the section 18.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

It is claimed:
1. A lap belt mechanism for use in conjunction with an ejectable seat for pilots or the like comprising a first section adapted to be connected to a first lap belt portion, a second section adapted to be connected to a second lap belt portion, a rigid member having first and second end portions cooperable with said first and second sections respectively, manually operable means for releasably connecting the first end portion of the said member with said first section in generally fixed relation, and normally connected means connecting the second end portion of said member with said second section in generally fixed relation operable during the seat ejecting procedure when said manually operable means is connected for effecting a gas pressure propelled movement relatively between said second section and said member in a direction away from each other and a release of the second end portion of said member with said second section whereby said sections are releasably propelled apart by a positive action during the ejecting procedure to permit separation of the pilot from the seat.

2. A lap belt mechanism as defined in claim 1 wherein the second end portion of said rigid member and said second section are movable relatively toward and away from each other and wherein said normally connected means comprises a locking element mounted for movement in said second section in a direction transverse to the direction of movement between said rigid member and said second section between a normally disposed locking position and a releasing position, and interengaging surface means operable when said locking element is normally disposed in said locking position for positively preventing movement of said rigid member away from said second section, said interengaging surface means being inclined with respect to the direction of relative movement of said rigid member and the direction of relative movement of said locking element at an angle sufficient to transmit a force applied by said rigid member resulting from belt tension to said locking element with a component acting in a direction to move the latter into its release position which is generally equal to the frictional resistance to such movement resulting from the normal component of such force.

3. A lap belt mechanism as defined in claim 1 wherein said manually operable means includes a thumb button mounted within a recess formed in the upper surface of said first section for rectilinear sliding movement between a spring urged locking position and a manual release position.

4. A lap belt mechanism as defined in claim 1 wherein said first section includes a recess extending in a direction toward said second section for receiving the first end portion of said rigid member, said first section having guide means extending transversely with respect to said recess in intersecting relation thereto for slidably receiving a parachute release clip therein, a clip actuated recess obstructing member carried by said first section for spring biased movement into a position within the intersection of said recess and said guide means preventing inward movement of said rigid member within said recess and for movement out of such position in response to the movement of a clip into said guide means permitting inward movement of said rigid member through the clip and within said recess.

5. A lap belt mechanism for use in conjunction with an ejectable seat for pilots or the like comprising a first section adapted to be connected to a first lap belt portion, a second section adapted to be connected to a second lap belt portion, a rigid member having first and second end portions cooperable with said first and second sections respectively, manually operable means for releasably connecting the first end portion of said rigid member with said first section in generally fixed relation, the second end portion of said rigid member and said second section being relatively movable toward and away from each other, a locking element mounted for movement in said second section in a direction transverse to the direction of movement between said rigid member and said second section between a normally disposed locking position and a releasing position, and interengaging surface means operable when said locking element is normally disposed in said locking position for positively preventing movement of said rigid member away from said second section, said interengaging surface means being inclined with respect to the direction of relative movement of said rigid member and the direction of relative movement of said locking element at an angle sufficient to transmit a force applied by said rigid member resulting from belt tension to said locking element with a component acting in a direction to move the latter into its release position which is generally equal to the frictional resistance to such movement resulting from the normal component of such force.

6. A lap belt mechanism as defined in claim 5 wherein the angle of inclination of said interengaging surface means is approximately 15 to 16° with respect to the direction of relative movement of said locking element.

7. A lap belt mechanism for use in conjunction with an ejectable seat for pilots or the like comprising a first section adapted to be connected to a first lap belt portion, a second section adapted to be connected to a second lap belt portion, a rigid member having first and second end portions cooperable with said first and second sections respectively, manually operable means for releasably connecting the first end portion of said rigid member with said first section in generally fixed relation, said second section having a bore formed therein extending in a direction toward said first section for receiving the second end portion of said rigid member, a push rod sealingly mounted within said bore for sliding movement between a release position wherein an outer end portion thereof extends outwardly of said bore and a normal locking position wherein said end portion is disposed within said bore, interengaging means on the second end portion of said rigid member and said push rod outer end portion for preventing movement of said rigid member out of said bore when said push rod is disposed in said normal locking position and releasable in response to the movement of said push rod into said release position, said second section having means defining a cylindrical chamber communicating with said bore intermediate the ends of the latter, a piston sealingly mounted within said chamber for movement from a normal locking position wherein an outer end portion thereof extends into said bore and a release position wherein said outer end portion is disposed within said chamber, interengaging surface means on the outer end portion of said piston and the adjacent portion of said push rod for retaining said push rod in its normal locking position when said piston is disposed in its locking position, and means for communicating air under pressure within the portion of said bore inwardly of the outer end portion of said push rod for effecting a movement of said piston from its normal locking position into its release position and said push rod from its normal locking position into its release position.

8. A lap belt mechanism as defined in claim 7 including shear pin means carried by said second section and operatively connected with said piston when the latter is disposed in its normal locking position so as to prevent movement of said piston into its release position until the air under pressure reaches a pre-determined value sufficient to fracture said shear pin means.

9. A lap belt mechanism as defined in claim 7 including a stop plug carried by said second section having an inner end portion disposed within said bore, said push rod having a slot formed in the adjacent surface thereof receiving the inner end portion of said stop plug, the inner end portion of said stop plug being positioned with respect to said slot to be engaged by one end of the latter when said push rod is moved into its release position to thereby prevent further outward movement of said push rod with respect to said bore.

10. A lap belt mechanism as defined in claim 7 wherein said interengaging surface means are inclined with respect to the axis of said bore and the axis of said chamber at an angle sufficient to transmit a force applied by said push rod resulting from belt tension to said locking piston with a component acting in a direction to move the latter into its release position which is generally equal to the frictional resistance to such movement resulting from the normal component of such force.

11. A lap belt mechanism as defined in claim 10 including annular sealing means between the inner end portion of said push rod and the inner end portion of said bore defining a pressure chamber acting on the inner end surface of said push rod and passage means extending from the inner end surface of said push rod to the associated interengaging surface means thereof.

12. A lap belt mechanism as defined in claim 11 wherein said first section includes a recess extending in a direction toward said second section for receiving the first end portion of said rigid member, said first section having guide means extending transversely with respect to said recess in intersecting relation thereto for slidably receiving a parachute release clip therein, a clip actuated recess obstructing member carried by said first section for spring biased movement into a position within the intersection of said recess and said guide means preventing inward movement of said rigid member within said recess and for movement out of such position in response to the movement of a clip into said guide means permitting inward movement of said rigid member through the clip and within said recess.

13. A lap belt mechanism as defined in claim 12 wherein said manually operable means includes a thumb button mounted within a recess formed in the uppper surface of said first section for rectilinear sliding movement between a spring urged locking position and a manual release position.

14. A lap belt mechanism for use in conjunction with an ejectable seat for pilots or the like comprising a first section adapted to be connected to a first lap belt portion, a second section adapted to be connected to a second lap belt portion, a rigid member having first and second end portions cooperable with said first and second sections respectively, said first section having a recess extending in a direction toward said second section for receiving the first end portion of said rigid member, said first section having guide means extending transversely with respect to said recess in intersecting relation thereto for slidably receiving a parachute release clip therein, a clip actuated recess obstructing member carried by said first section for spring biased movement into a position within the intersection of said recess and said guide means preventing inward movement of said rigid member within said recess and for movement out of such position in response to the movement of a clip into said guide means permitting inward movement of said rigid member through the clip and within said recess, manually operable means carried by said first section for releasably locking said rigid member within said recess and through the clip whereby the latter is retained by said guide means with said first section, and means normally connecting the second end portion of said rigid member with said second section releasable during the seat ejection procedure to permit separation of the pilot from the seat.

15. A lap belt mechanism as defined in claim 14 wherein said manually operable means includes a thumb button mounted within a recess formed in the upper surface of said first section for rectilinear sliding movement between a spring urged locking position and a manual release position.

16. A lap belt mechanism as defined in claim 15 including a sliding bolt member mounted within said first section for movement with said thumb button, said rigid member having cooperatively shaped notch means formed in the first end portion thereof for receiving said bolt member when the latter is disposed in a position corresponding with the locking position of said thumb button and spring means mounted within the inner end portion of said recess for engagement and depression by the first end portion of said rigid member when the latter is locked within said recess by said bolt member whereby said spring means will effect a relative movement between said first section and said rigid member in a direction to separate the same in response to the movement of said bolt member through manual actuation of said thumb button into said release position.

References Cited
UNITED STATES PATENTS

| 2,754,073 | 7/1956 | Holm et al. | 244—122 |
| 2,755,043 | 7/1956 | Holm et al. | 244—122 |
| 2,763,451 | 9/1956 | Moran | 244—122 |
| 2,797,883 | 7/1957 | Martin et al. | 244—122 |
| 2,840,327 | 6/1958 | Stanley | 244—122 |
| 2,924,405 | 2/1960 | Dalglish | 244—122 |

MILTON BUCHLER, *Primary Examiner.*

B. BELKIN, *Assistant Examiner.*